N. H. HILL.
Reclining-Chair.
No. 160,673.
Patented March 9, 1875.
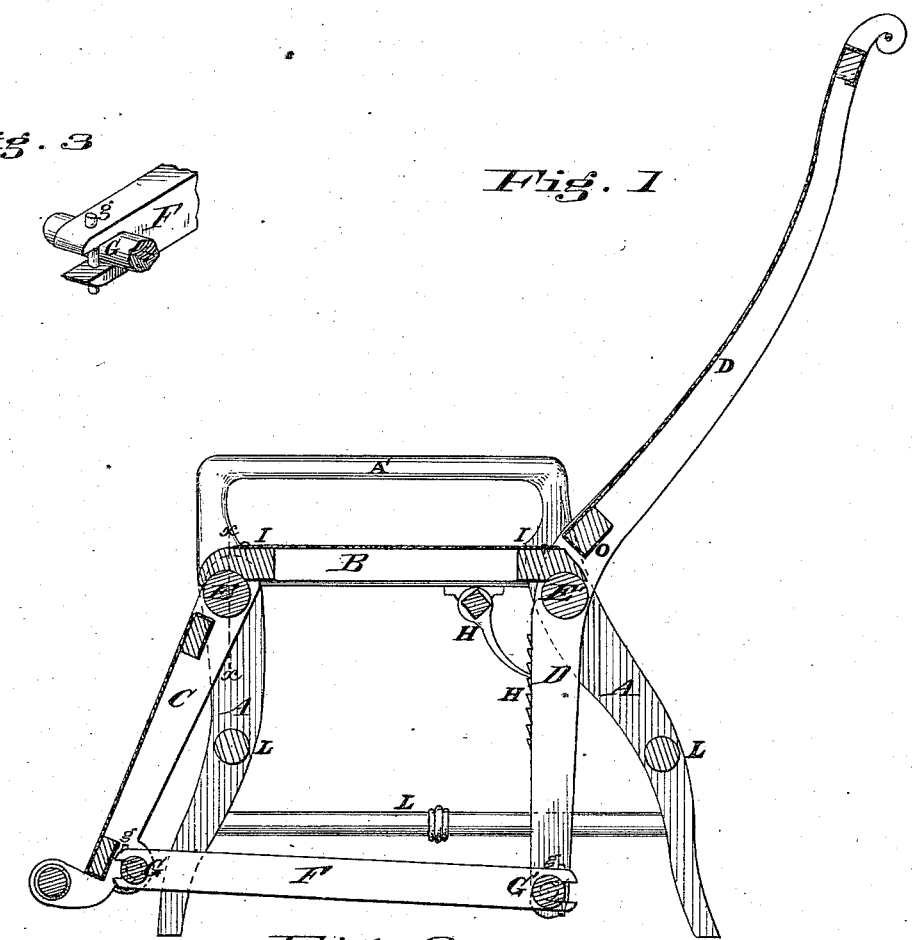
Inventor
Nathan H. Hill
By Wood & Boyd
His Attorneys

UNITED STATES PATENT OFFICE.

NATHAN H. HILL, OF CINCINNATI, OHIO, ASSIGNOR TO JOHN K. COOLIDGE, NATHAN H. HILL, AND EDWIN C. COOLIDGE, OF SAME PLACE.

IMPROVEMENT IN RECLINING-CHAIRS.

Specification forming part of Letters Patent No. 160,673, dated March 9, 1875; application filed September 10, 1874.

*To all whom it may concern:*

Be it known that I, NATHAN H. HILL, of Cincinnati, in the county of Hamilton and State of Ohio, have invented certain new and useful Improvements in Reclining-Chairs, of which the following is a specification:

The object of my invention is, first, to dispense with the use of hinges for connecting the operative parts of the chair; second, to increase the durability and lessen the cost of construction, and thereby to construct a folding chair, so that it can be constructed and shipped as a "knock-down chair."

The invention relates to reclining-chairs, and has for its object to provide a chair which can be detached for transportation and placed together with ease and facility.

The improvements are fully hereinafter described, and pointed out in the claim.

In the accompanying drawing, Figure 1 is a vertical central section of my improved chair, taken from the front to the back. Fig. 2 is a portion of a cross-section taken on the line $x\ x$, Fig. 1; and Fig. 3 is a perspective view of one end of the connecting-rods attached to the foot-piece.

A A represent chair-posts, and A' the arm connecting them in the manner usual to armchairs. D D represent the side pieces of the back, which may be of any desired angle or curvature. L L L represent ordinary rounds for connecting and bracing the legs or posts. C represents side rails, forming the frame for the foot-piece. E represents the round for connecting and bracing the front posts, and for supporting the seat. The tenons are made to extend within the posts A a sufficient distance to allow the side rails of the foot-support to pivot and turn upon them at the top, as shown at E, Fig. 1. The back pieces are, in a similar manner, pivoted to turn on the round E', supporting the back of the seat. B represents a loose seat, which is shown as constructed of frame-pieces with canvas or cane bottom. The front and rear rails I I are grooved to fit the rounds E E', as shown in Fig. 1. Those grooves, with the posts A A projecting up each side of the seat, hold it from side and lateral displacement, while it can be easily raised vertically, thereby constituting what is known as a "loose seat." The foot-pieces C and back D, being pivoted to the seat-rounds, are made so as to turn readily upon them, the rounds acting as pivot-bearings. F represents the rods connecting the foot-piece to the back, which pivots and turns upon the lower rounds in a manner similar to the back and foot-piece upon the rounds supporting the seat. The eye-bearing in the rods is slotted, so as to allow the rod F to be removed endwise from its pivot-bearing. $g'$ represents a removable pin for securing rod F in position for use. G represents a round, constructed similar to round E, Fig. 2, for connecting the rails of the foot-piece together, and forming pivot-bearings for one end of rods F. G' represents a similar round connecting the bottom of the back rails. H H represent a ratchet and pawl for adjusting and sustaining the foot-piece and back at any desired angle of inclination.

It is obvious that the method here shown of pivoting the back and foot-piece, together with the method of attaching the seat and the detachable connecting-rods, forms a "knock-down chair."

I claim—

The combination, in a reclining-chair, of the front and rear fixed rounds E E', connecting the side frames A, the back D, and the foot-piece C, pivoted directly upon the tenons of the fixed rounds, the removable seat I, having front and rear grooved rails fitting the rounds, and disconnected from the back and foot-piece, and the rods F, having slotted ends embracing the lower rounds of the back and foot-piece, all substantially as shown and described.

In testimony whereof I have hereunto set my hand this 8th day of September, 1874.

NATHAN H. HILL.

Witnesses:
HERMAN MERRELL,
JOHN O' GARA.